(12) United States Patent
Rickenbacker

(10) Patent No.: US 7,165,354 B1
(45) Date of Patent: Jan. 23, 2007

(54) ROACH KILLER KIT

(76) Inventor: Eugene Rickenbacker, 2623 Shirley Ave., Baltimore, MD (US) 21215

( * ) Notice: Subject to any disclaimer, the term of this patent is extended or adjusted under 35 U.S.C. 154(b) by 0 days.

(21) Appl. No.: 11/075,580

(22) Filed: Mar. 8, 2005

(51) Int. Cl.
*A01M 1/20* (2006.01)
(52) U.S. Cl. .......................... 43/131; 43/121
(58) Field of Classification Search ................. 43/121, 43/131
See application file for complete search history.

(56) References Cited

U.S. PATENT DOCUMENTS

| 890,636 | A |   | 6/1908 | Fride |   |
|---|---|---|---|---|---|
| 4,035,946 | A | * | 7/1977 | Rapp et al. | 43/131 |
| 4,182,070 | A | * | 1/1980 | Connelly | 43/131 |
| 4,807,391 | A |   | 2/1989 | Bokiau |   |
| 4,958,456 | A |   | 9/1990 | Chaudoin |   |
| 5,875,586 | A | * | 3/1999 | Ballard et al. | 43/131 |
| 2002/0056223 | A1 | * | 5/2002 | Garretson | 43/121 |

* cited by examiner

*Primary Examiner*—Kurt Rowan (57) ABSTRACT

A pest control apparatus for killing off roaches, ants, and other pest bugs. The apparatus is designed to be placed in a wide variety of positions or locations to attract and/or kill insects with an amount of chemical included within the base of the present invention.

2 Claims, 8 Drawing Sheets

ROACH KILLER KIT

I. BACKGROUND OF THE INVENTION

The present invention concerns that of a new and improved pest control apparatus for killing off roaches, ants, and other pest bugs.

II. DESCRIPTION OF THE PRIOR ART

U.S. Pat. No. 4,807,391, issued to Bokiau, discloses a U-shaped housing for holding and dispensing an insecticide comprised of boric acid.

U.S. Pat. No. 4,958,456, issued to Chaudoin, discloses a means for controlling insects by dispensing boric acid into an infested area.

U.S. Pat. No. 890,636, issued to Fride, discloses an insecticide composition comprised of borax.

III. SUMMARY OF THE INVENTION

The present invention concerns that of a new and improved pest control apparatus for killing off roaches, ants, and other pest bugs. The apparatus is designed to be placed in a wide variety of positions or locations to attract and/or kill insects with an amount of chemical included within the base of the present invention.

There has thus been outlined, rather broadly, the more important features of a pest control apparatus that the detailed description thereof that follows may be better understood and in order that the present contribution to the art may be better appreciated. There are, of course, additional features of the pest control apparatus that will be described hereinafter and which will form the subject matter of the claims appended hereto.

In this respect, before explaining at least one embodiment of the pest control apparatus in detail, it is to be understood that the pest control apparatus is not limited in its application to the details of construction and to the arrangements of the components set forth in the following description or illustrated in the drawings. The pest control apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present pest control apparatus. It is important, therefore, that the claims be regarded as including such equivalent constructions insofar as they do not depart from the spirit and scope of the present invention.

It is therefore an object of the present invention to provide a pest control apparatus which has all of the advantages of the prior art and none of the disadvantages.

It is another object of the present invention to provide a pest control apparatus which may be easily and efficiently manufactured and marketed.

It is another object of the present invention to provide a pest control apparatus which is of durable and reliable construction.

It is yet another object of the present invention to provide a pest control apparatus which is economically affordable and available for relevant market segment of the purchasing public.

Other objects, features and advantages of the present invention will become more readily apparent from the following detailed description of the preferred embodiment when considered with the attached drawings and appended claims.

V. DESCRIPTION OF THE PREFERRED EMBODIMENT

Figure 1:
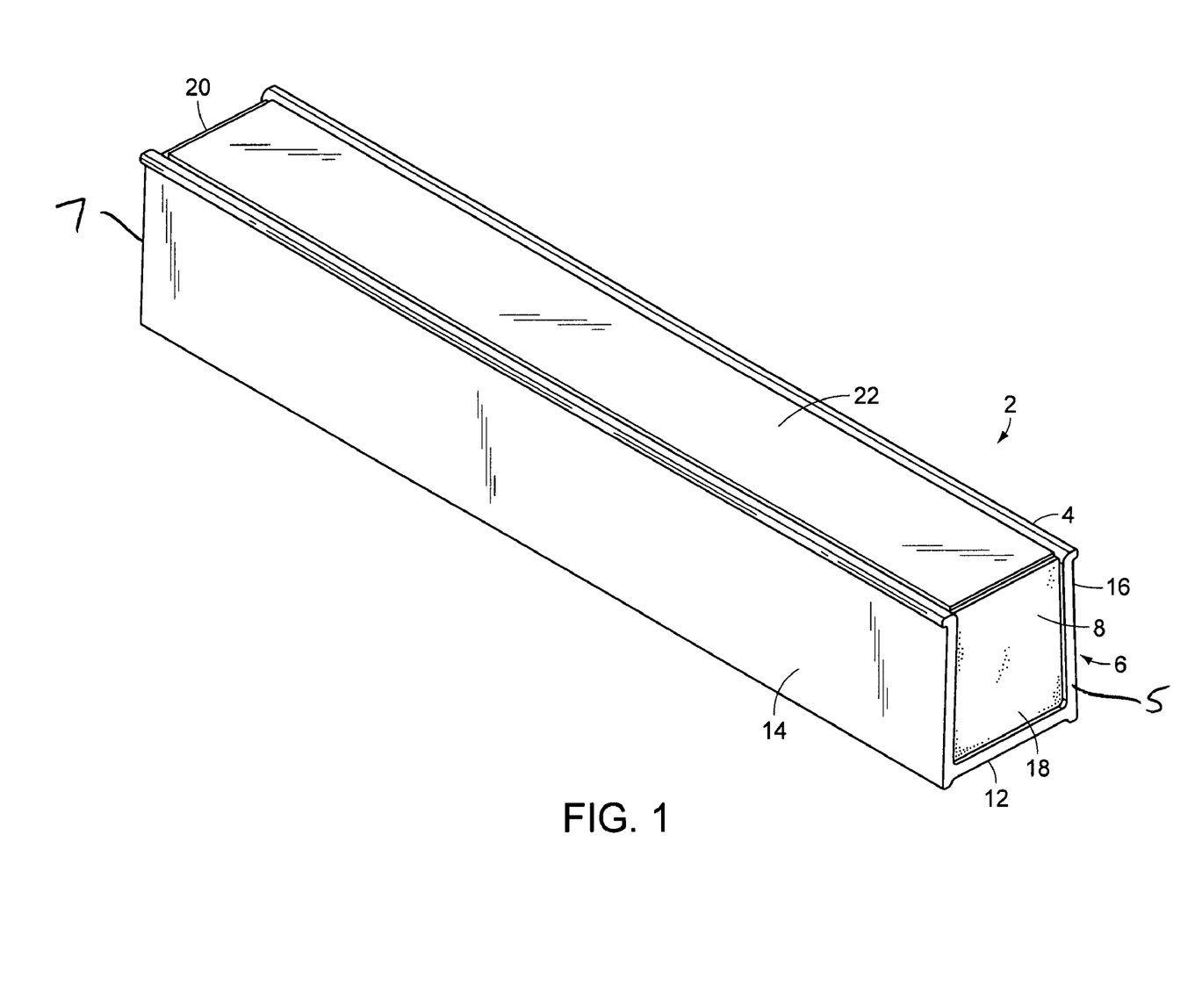
FIG. 1 shows a perspective view of the lower portion of the first embodiment of the apparatus.

FIG. 1 shows a perspective view of the lower portion 4 of the first embodiment of the apparatus 2. Lower portion 4 has two ends, a first end 5 and a second end 7, and has an internal reservoir 6 where an amount of chemicals 8 would be located. The chemicals 8 are ideally in powder form and would be chemicals that are known for their insect-killing properties.

Lower portion 4 has a base 12 which has two side edges, a first side edge and a second side edge, and two ends, a first end 5 and a second end 7. To the first side edge is attached first wall 14, and to the second side edge is attached second wall 16. Lower portion 4 has a U-shaped cross-section, with both ends being open.

Prior to the amount of chemicals 8 being placed within the reservoir 6 of lower portion 4, stoppers 18 and 20 are placed on the first end and second end, respectively, of lower portion 4. Stoppers 18 and 20 prevent the chemical from leaking out. In addition, an amount of tape 22 is placed over the entire exposed "top" of the lower portion 4, effectively sealing in the amount of chemicals 8 within the lower portion 4. This tape 22 is to prevent accidental leakage of the powder during transport or non-use.

Figure 2:
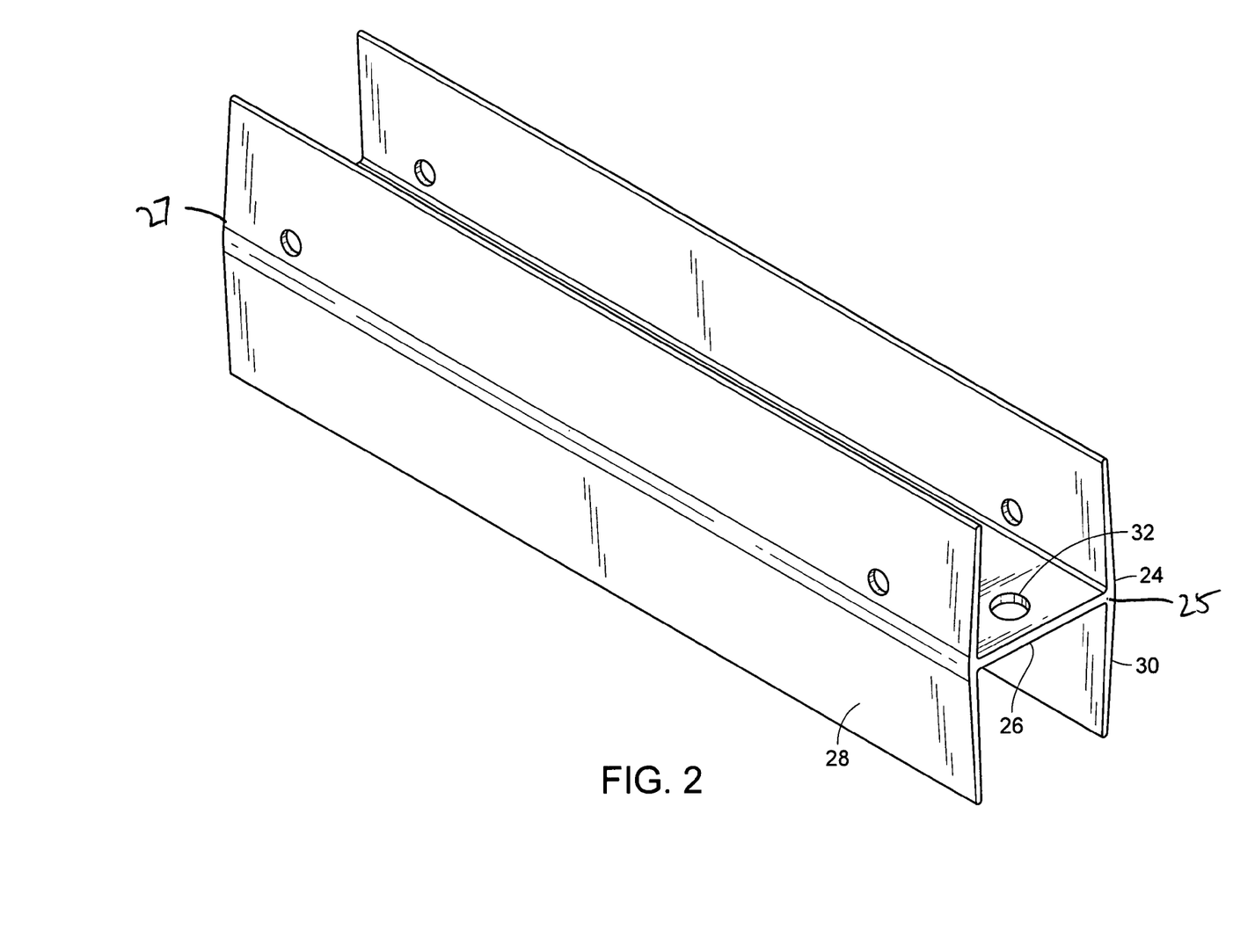
FIG. 2 shows a perspective view of the middle portion of the first embodiment of the apparatus.

FIG. 2 shows a perspective view of the middle portion 24 of the first embodiment of the apparatus 2. Middle portion 24 has a base 26 that has two ends, a first end 25 and a second end 27, and has two side edges, a first side edge and a second side edge. Middle portion 24 also has first wall 28 attached to the first side edge of the base 26 of the middle portion and a second wall 30 attached to the second side edge of the base 26 of the middle portion 24.

First wall 28 and second wall 30 each have two surfaces, an inner surface and an outer surface, and two side edges, a top side edge and a bottom side edge. The attachment point of the base 26 to each of the walls is approximately halfway between the top side edge and the bottom side edge of each of the walls, thereby giving the middle portion 24 a H-shaped cross-sectional shape.

The base 26 of middle portion 24 has a plurality of holes 32. When placed on the lower portion 4, the tape underneath the holes that is visible can be "punched out" to get access to the chemicals. Insects will then enter these holes and die based on exposure or consumption of the chemicals inside the reservoir 6 within the lower portion 4.

Figure 3:
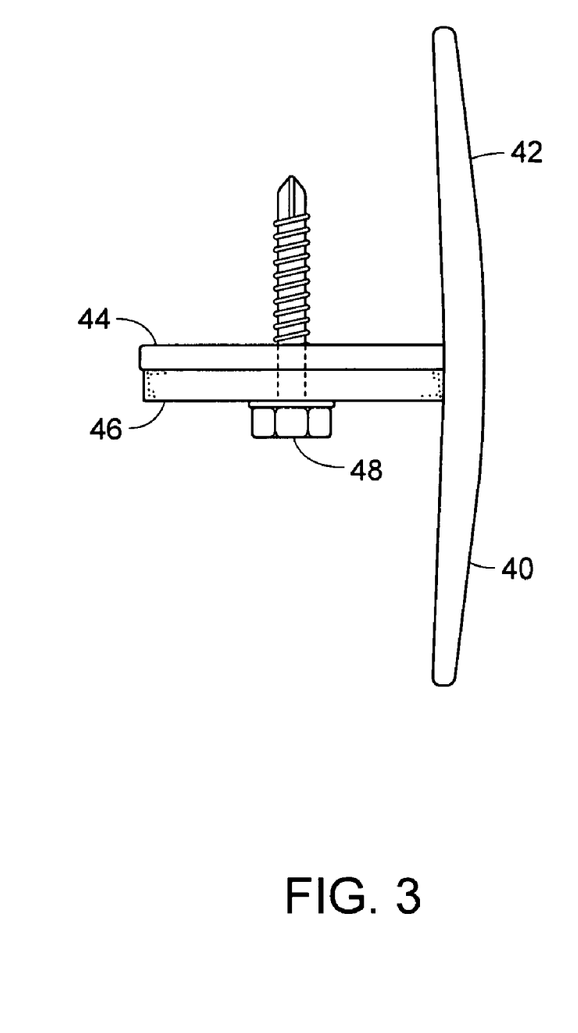
FIG. 3 shows a side view of a border used with the upper portion of the first embodiment of the present invention.

FIG. 3 shows a side view of a border 40 used with the middle portion 24 of the first embodiment of the present invention. Border consists of outer section 42, horizontal plate 44, padding 46, and screw 48. A border 40 is placed against each end of the middle portion 24 in such a shape that the padding 46 and the horizontal plate 44 are located immediately above the top surface of the base 26 of the middle portion 24. Then, screw 48 is drilled up underneath through the bottom surface of the base 36 and through the horizontal plate 44 and the padding 46. Attaching border 40 to the middle portion 24 in this manner causes the outer section 42 to create a border against each end of the middle portion 24, preventing escape by insects.

Figure 4:
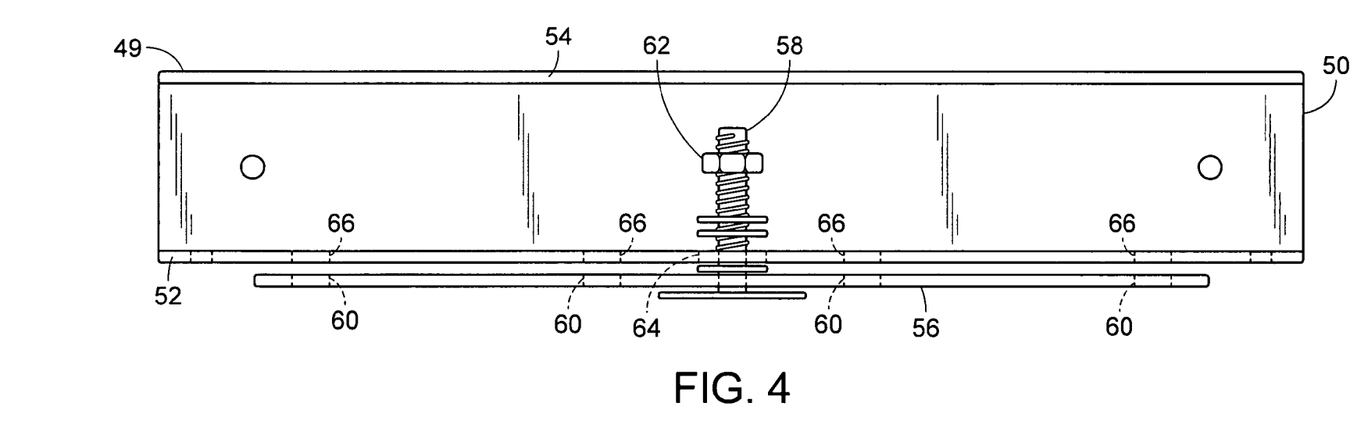
FIG. 4 shows a front view of the upper portion of the first embodiment without the slide bar attached.

FIG. 4 shows a front view of the upper portion 49 of the first embodiment without the slide bar attached. Upper portion 49 has two ends, a first end 51 and a second end 53. Upper portion 49 comprises a back bar 50 that has two side edges, a top side edge and a bottom side edge. The top side edge has an attached upper bar 54, while the bottom side edge has an attached lower bar 52. Back bar 50, lower bar 52, and upper bar 54 each have two surfaces, an outer surface and an inner surface.

Spacer bar 56 is pivotally attached to lower bar 52 of upper portion 49 through use of screw 58. Spacer bar 56 has a plurality of holes 60 in it. Screw 58 has a couple of connected washers 60 to space it out and also has an incorporated nut 62 that limits how far spacer bar 56 can extend outward from the lower bar 52 of upper portion 49. Furthermore, the connector hole 64 in which screw 58 is inserted through is line-shaped, allowing screw 58 and spacer bar 56 to move from side to side approximately one inch.

Lower bar 52 also has a plurality of holes 66 in it, evenly spaced out. The holes 66 in the lower bar 52 of upper portion 49 are designed to be spaced out in the same manner as the plurality of holes 60 in the spacer bar 56 and the plurality of holes 32 in the middle portion 24.

Figure 5:
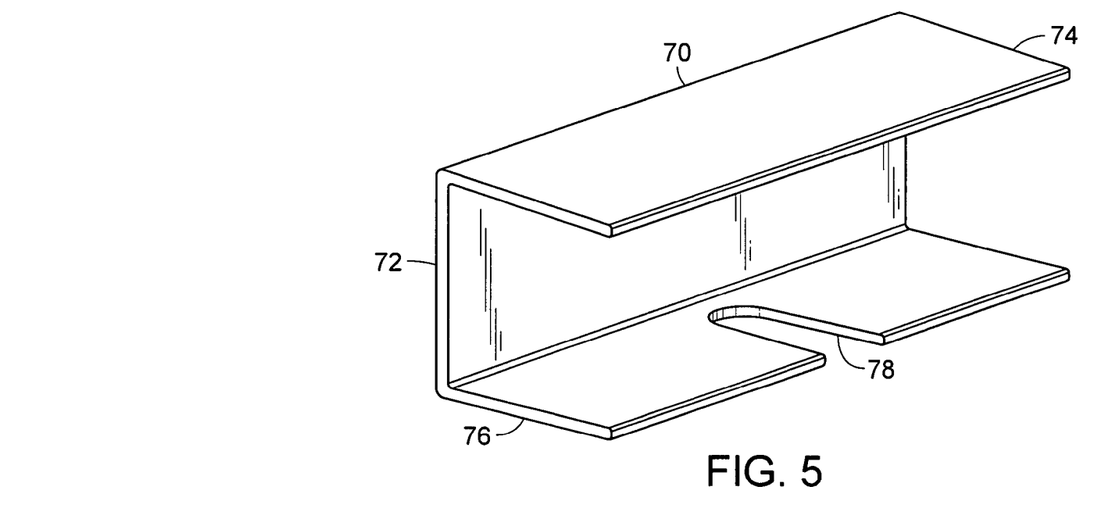
FIG. 5 shows a perspective view of the slide bar of the present invention.
Figure 6:
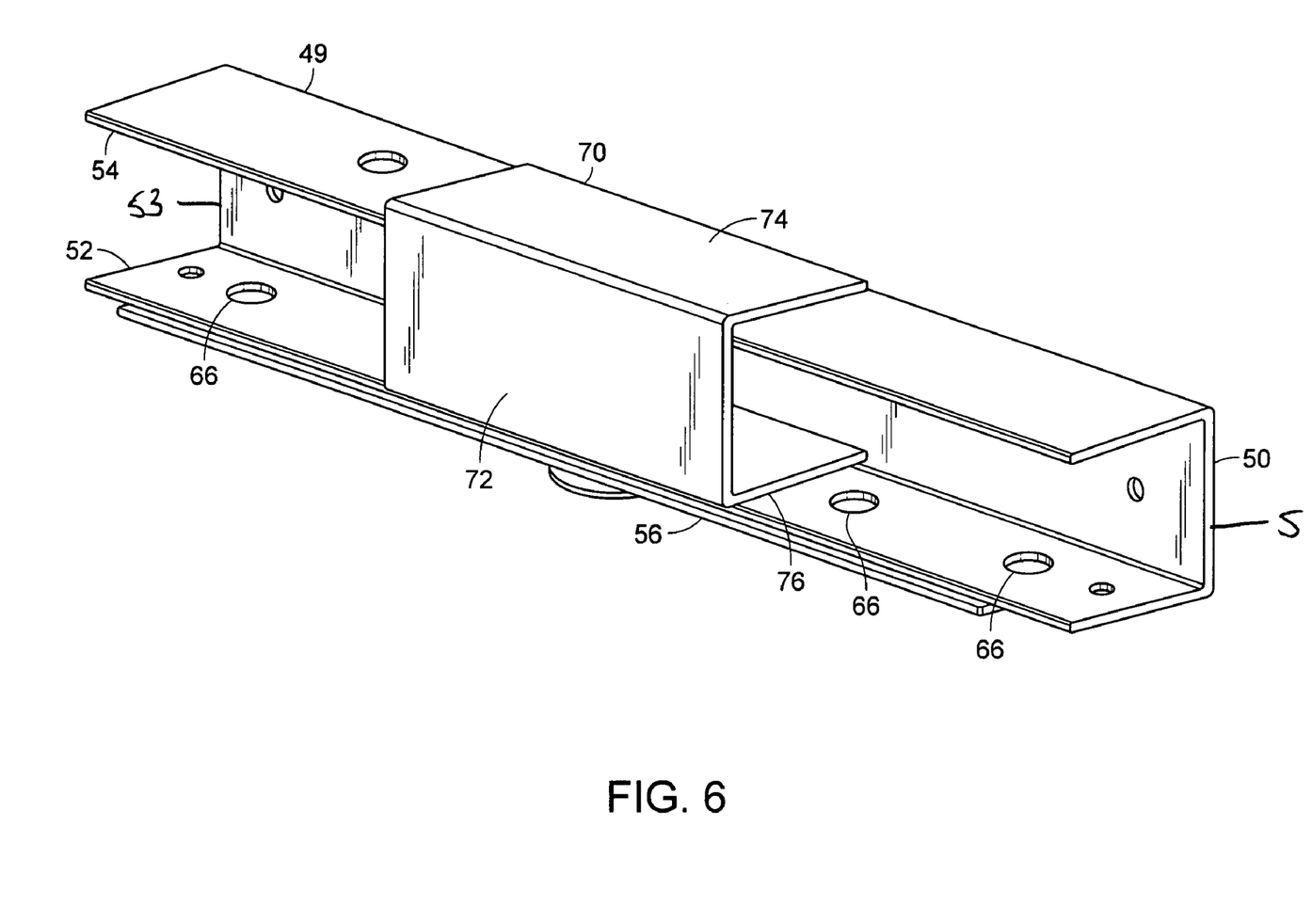
FIG. 6 shows a side view of the upper portion of the first embodiment after the slide bar has been attached to the upper portion of the first embodiment.

FIG. 5 shows a perspective view of the slide bar 70 of the present invention, while FIG. 6 shows a side view of the upper portion 49 of the first embodiment after the slide bar 70 has been attached to the upper portion 49 of the first embodiment. Slide bar 70 has comprises a back bar 72 that has two side edges, a top side edge and a bottom side edge. The top side edge has an attached upper bar 74, while the bottom side edge has an attached lower bar 76. Back bar 72, lower bar 76, and upper bar 74 each have two surfaces, an outer surface and an inner surface.

Groove 78 is located in the middle of lower bar 76. When slide bar 70 is attached to the upper portion 49, groove 78 is placed against upper portion 49 such that the screw is located within the groove 78 and the lower bar 76 is placed in between the lower bar 52 of the upper portion 49 and the spacer bar 56. This will allow an individual to control movement of the spacer 56 once the upper portion 49 is connected to the middle portion 24.

Figure 7:
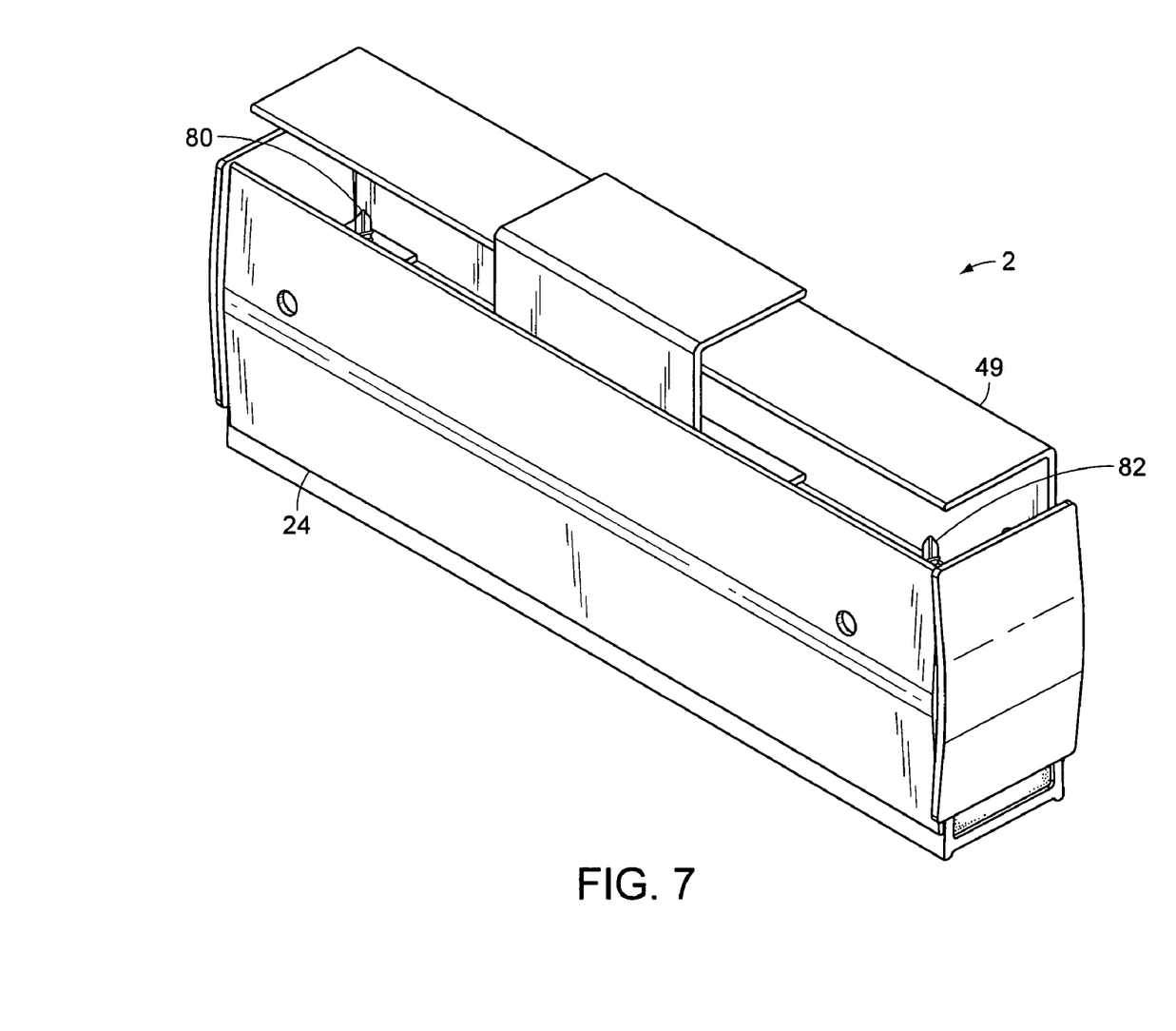
FIG. 7 shows a perspective view of how the first embodiment would appear in use.

FIG. 7 shows a perspective view of how the first embodiment would appear in use. Once the upper portion 49 is placed over the middle portion 24, is fixedly attached to the middle portion 24 by screws 80 and 82, which can be drilled through the sides of upper portion 49 and middle portion 24.

Figure 8:
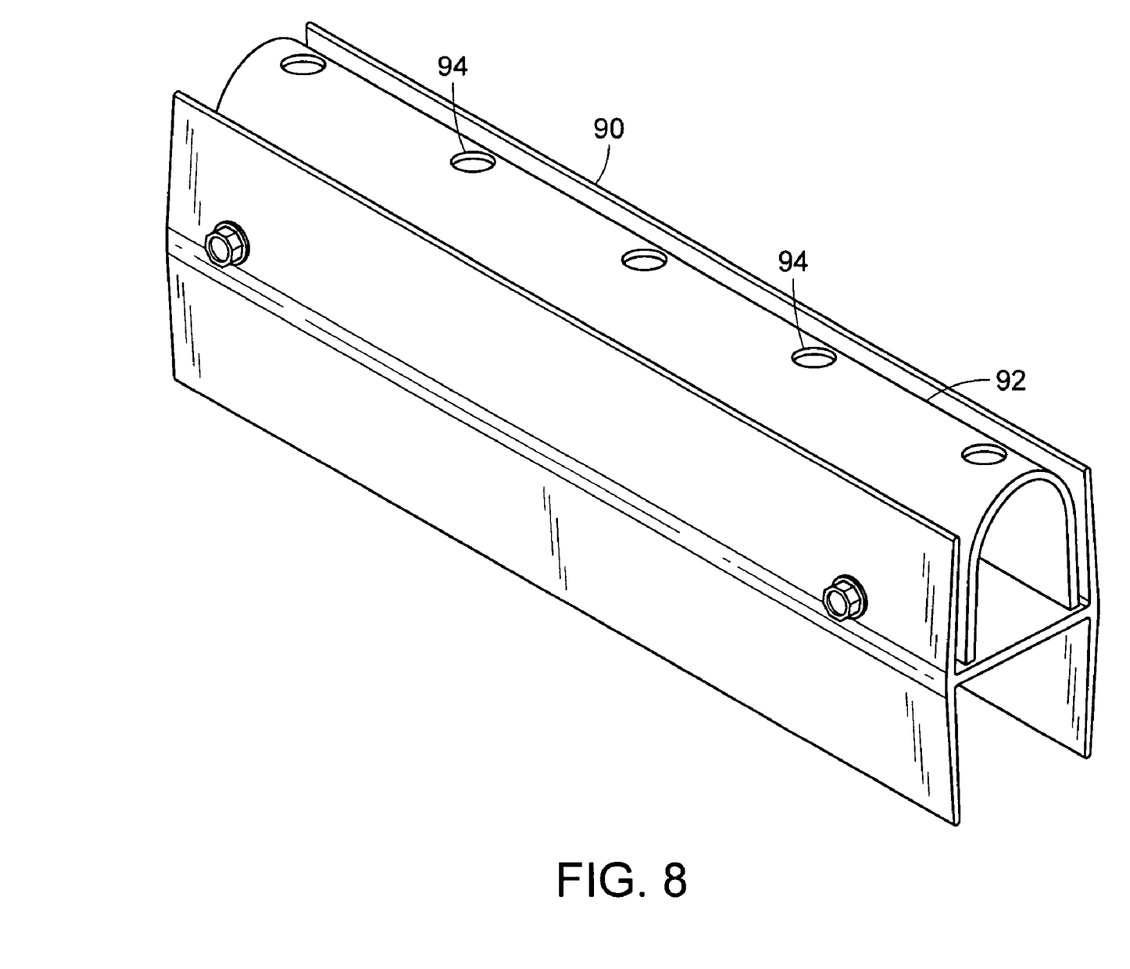
FIG. 8 shows a perspective view of the middle portion used in the second embodiment of the present invention.

FIG. 8 shows a perspective view of the middle portion 90 used in the second embodiment of the present invention. In addition to the parts that were explained and shown in the middle portion 24 of the first embodiment, a length of sheeting 92 is present. Sheeting 92 has two ends, a first end and a second end, and has a plurality of holes 94 spaced out on it surface. When sheeting 92 is placed within the middle portion 90, is wedged into a U-shape, with the rounded portion sticking upward away from the middle portion 90.

The holes 94 on the sheeting 92 are spaced out evenly, but are designed to alternate with the holes that are on the top of the base 26 of the middle portion 24. This allows for some child-proofing and prevents the chemicals within the lower portion 4 from easily seeping out if the apparatus 2 it handled.

Figure 9:
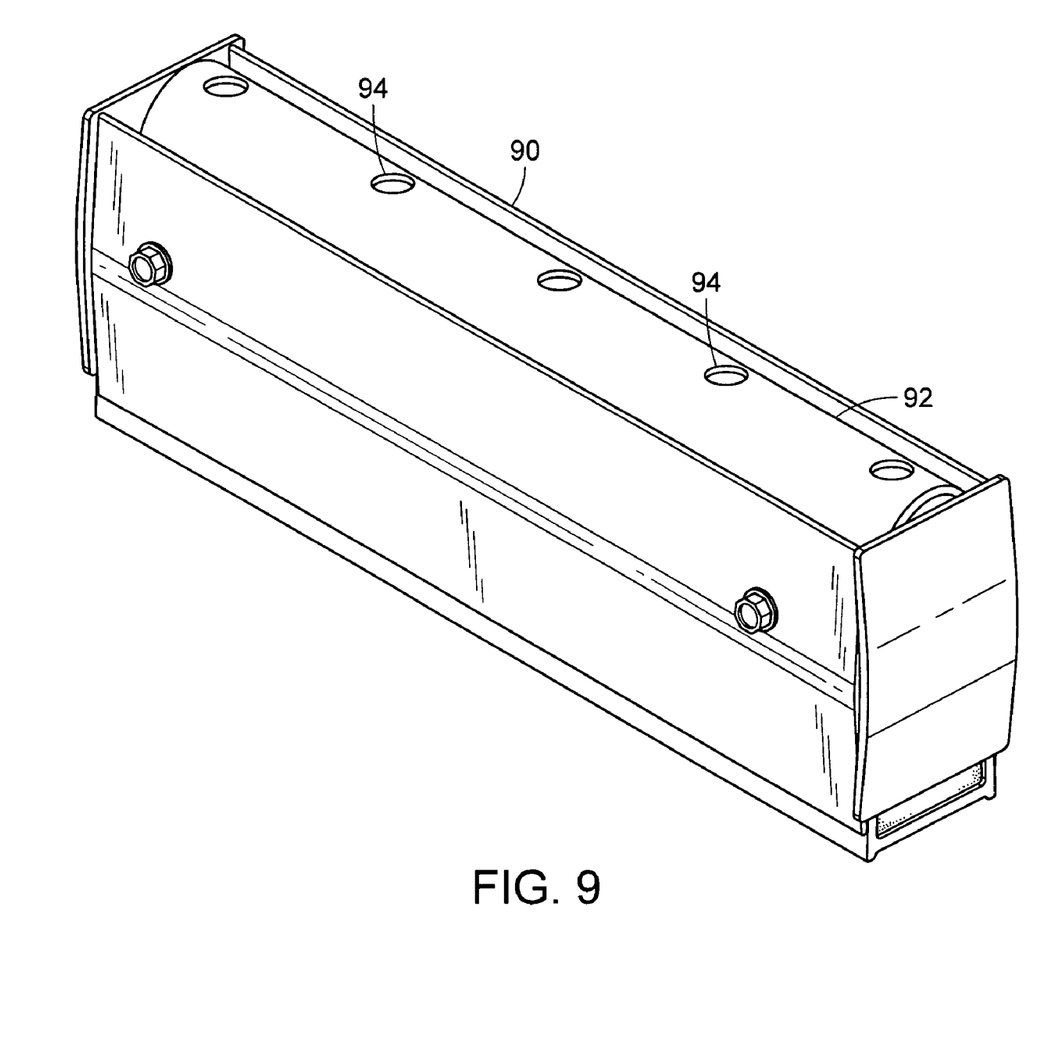
FIG. 9 shows a perspective view of how the second embodiment would appear in use.

FIG. 9 shows a perspective view of how the second embodiment would appear in use. It should be noted that in the second embodiment, there is not "upper portion" section or component.

I claim:

1. A pest control apparatus comprising
   a lower portion having a first end and a second end, the lower portion including a base having a first end and a second end,
   an internal reservoir located within the lower portion,
   an amount of chemicals located within the internal reservoir,
   a pair of walls comprising a first wall and a second wall, the first wall being attached to the base, the second wall being attached to the base opposite the first wall,
   a pair of stoppers comprising a first stopper and a second stopper, the first stopper being placed on the first end of the lower portion, the second stopper being placed on the second end of the lower portion,
   an amount of tape placed over the lower portion,
   a middle portion having a base, the base of the middle portion having a first end and a second end,
   a second pair of walls comprising a first wall and a second wall, the first wall of the second pair of walls attached to the base of the middle portion, the second wall of the second pair of walls attached to the base of the middle portion opposite the first wall,
   at least one hole located in the base of the middle portion,
   at least two borders, each border being attached to an end of the middle portion,
   an upper portion having a first end and a second end, the upper portion further comprising a back bar that has an outer surface and an inner surface,
   a first pair of attached bars comprising an attached upper bar and an attached lower bar, the attached upper bar of the first pair of attached bars being attached to the back bar of the upper portion, the attached lower bar of the first pair of attached bars being attached to the back bar of the upper portion opposite the upper bar,
   a spacer bar pivotally attached to the attached lower bar,
   a second plurality of holes located in the spacer bar,
   a slide bar comprising a back bar,
   a second pair of attached bars comprising an attached upper bar and an attached lower bar, the attached upper bar of the first pair of attached bars being attached to the back bar of the slide bar, the attached lower bar of the first pair of attached bars being attached to the back bar of the slide bar opposite the upper bar,
   wherein the upper portion is placed into the middle portion, further wherein the lower portion is placed into the middle portion, further wherein the middle portion is connected to the lower portion, and further wherein the upper portion is fixedly attached to the middle portion.

2. A pest control apparatus according to claim 1 wherein the chemicals placed within the pest control apparatus are in powder form.

* * * * *